Jan. 22, 1929.                    R. C. SCHEMMEL                    1,700,081
                                   SPARE TIRE COVER
                                  Filed Sept. 23, 1927

Witness
Edwin L. Bradford

Inventor
Robert C. Schemmel
By Wm. O. Dyre
his Attorney

Patented Jan. 22, 1929.

1,700,081

UNITED STATES PATENT OFFICE.

ROBERT C. SCHEMMEL, OF UNION CITY, INDIANA, ASSIGNOR, BY MESNE ASSIGNMENTS, TO BACKSTAY WELT COMPANY, OF UNION CITY, INDIANA, A CORPORATION OF INDIANA.

SPARE-TIRE COVER.

Application filed September 23, 1927. Serial No. 221,556.

My present invention relates to new and improved detachable covers for spare automobile tires.

The primary object of the invention is to provide a novel and improved form of covering, which is designed, arranged and adapted for neatly enclosing and protecting extra spare tires, such as are carried for emergency use by automobiles. It has for a further object the production of seamless, one-piece, knitted spare tire covers which are waterproof and remarkably smooth-fitting in appearance because of their mechanical construction and their novel method of manufacture.

It has for a further object the production of spare tire covers which are readily applied or removed from operative position and which at all times present a most attractive appearance, due to the process by which manufactured.

With the foregoing and other objects in view, the novelty will be hereinafter particularly described and set forth in the appended claims.

In the accompanying drawings, which form part of this application for Letters Patent and whereon like numerals refer to corresponding parts in the several views.

Figure 1:
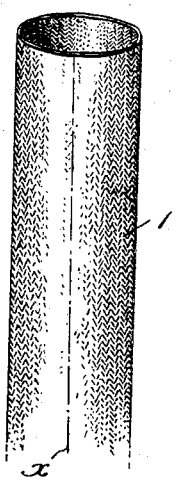
Figure 1 represents in perspective a tubular knitted body blank, formed in continuous lengths, preferably upon a circular knitting machine.
Figure 2:
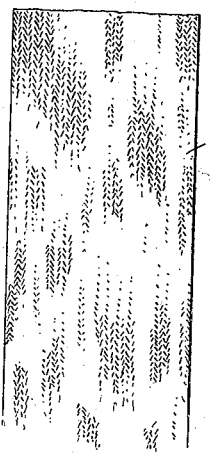
Figure 2 is a side elevation of a flat piece of knitted fabric of one-piece construction ready for forming into a tire cover.

Reference being had to the drawings and numerals thereon, 1 indicates a one-piece tubular knitted body for use in manufacturing spare tire covers involving the present invention, and preferably formed upon a circular knitting machine. The tubular body, having been thus produced, of any suitable length and circumference, is next severed longitudinally and centrally, as indicated by the dot and dash line x, upon Figure 1, to produce the flat knitted blank 2, shown by Figure 2 of the drawings.

Figure 3:
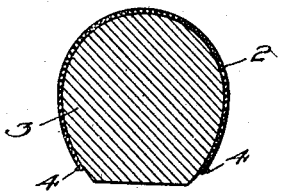
Figure 3 illustrates in cross-section the next step in the formation of the improved covers under consideration, showing a cross-section of an annular work form upon which the cover forming material is initially stretched.

This knitted blank 2, or body material, of suitable length and width, is then stretched upon the somewhat over-sized annular work form 3, of wood, metal, or any suitable material capable of retaining its form, and approximating in size and shape the dimensions of the average spare tire to be covered. Because of the knitted character of the body material 2, it will be apparent that the same accurately and smoothly adapts itself, when stretched in place, to the exterior configuration of the annular work form 3 so as to present a perfectly smooth unwrinkled surface as shown by Figure 3, and, as one means of temporarily and securely retaining the body material 2 in its stretched and fitted position upon work form 3 while being treated, the latter may be provided on both edges and at one point transversely with a series of small pins or retaining studs 4, as best shown by Figure 5.

Figure 4:
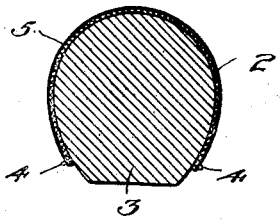
Figure 4 is a view corresponding with the preceding Figure 3, except that the stretched cover has here been treated and coated with an exterior leatherizing and water-proofing compound.

While thus stretched upon the work form 3, which may or may not be mounted centrally so as to rotate axially, the exterior surface of the tire cover in process of manufacture is next sized and impregnated with a suitable fixing filler or treated with any of the well known water-proofing and leatherizing compounds, as shown at 5 in Figure 4. This treatment not only produces a very satisfactory leather substitute, but causes the normally yielding and elastic knitted body to take a relatively stiff, but not unyielding set in the required size and shape.

Figure 5:
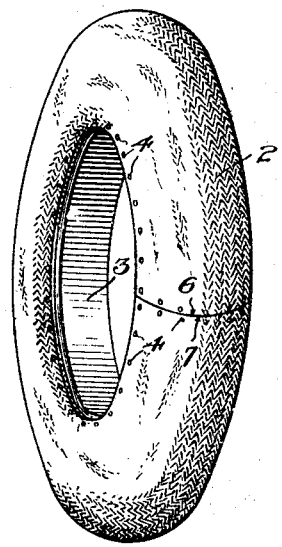
Figure 5 is a perspective view showing cover stretched upon and temporarily secured to the work form, preparatory to graining, and, Figure 6, also a perspective view, shows the completed cover after waterproofing and surface graining, but removed from its supporting form, ready for application as a covering for a spare tire.

While thus mounted upon work form 3 or its equivalent, and preferably rotatably supported by any approved means (not shown) with the extreme ends 6 and 7 of the cover abutting as indicated by Figure 5, the entire outer surface of the cover is next subjected to the action of, or rotated beneath, a suitable revolving graining tool, such as ordinarily employed in graining imitation leather and imitation leather products.

Figure 6:
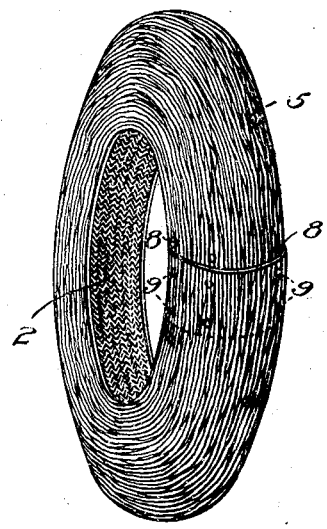

This accomplished, the cover in process of manufacture, water-proofed, leatherized and suitably grained, is removed from its work form 3. Its one end 6 is then provided with slightly projecting metallic studs 8, and its opposite end with the wellknown metallic snap sockets 9, which together serve to adjustably and detachably connect such ends when overlapped, as shown in the completed product represented by Figure 6 of the drawings.

When constructed substantially as shown and described, the completed cover has some range of circumferential adjustment to provide for tires of different diameters as the result of its let-out and take-up feature in the ends 6 and 7 of the completed structure. It is also true that a single cover will stretch in width sufficiently to accommodate tires of varying widths within certain limits.

Where a drum form of cover is desired this is readily produced by supplying a simple disk of seamless material to be stitched or otherwise secured to the inner periphery of cover at one side of the structure like a drum head.

The method hereinbefore indicated for producing the present improved spare tire cover, is only one of several methods by which the article can be made, and applicant therefore desires it understood that he is not restricted to any particular method but lays claim to the cover as an article of manufacture as defined by the several claims remaining in this case, regardless of the method by which produced.

Having thus described my improved process and product, what I now claim and desire to secure by Letters Patent is:

1. As an article of manufacture a seamless cover for spare tires comprising a universally elastic, knitted foundation fabric stretched into substantial conformity with the exterior surface of the tire to be covered, and means for retaining the cover in its stretched operative form.

2. As an article of manufacture a seamless fitted cover for spare tires comprising a universally elastic, knitted foundation fabric smoothly stretched into substantial conformity with the exterior surface of the tire to be covered, and means for retaining the cover in its stretched operative form.

3. As an article of manufacture a seamless cover for spare tires comprising a universally elastic knitted foundation fabric stretched into substantial conformity with the exterior surface of the tire to be covered, and a fixing filler incorporated in said fabric for maintaining the cover in its stretched form.

4. As an article of manufacture a seamless cover for spare tires comprising a universally elastic knitted foundation fabric stretched into substantial conformity with the exterior surface of the tire to be covered, and a suitable water proof fixing filler incorporated in said fabric for maintaining same in its stretched and unwrinkled form.

In testimony whereof I affix my signature.

ROBERT C. SCHEMMEL.